United States Patent Office 2,980,334
Patented Apr. 18, 1961

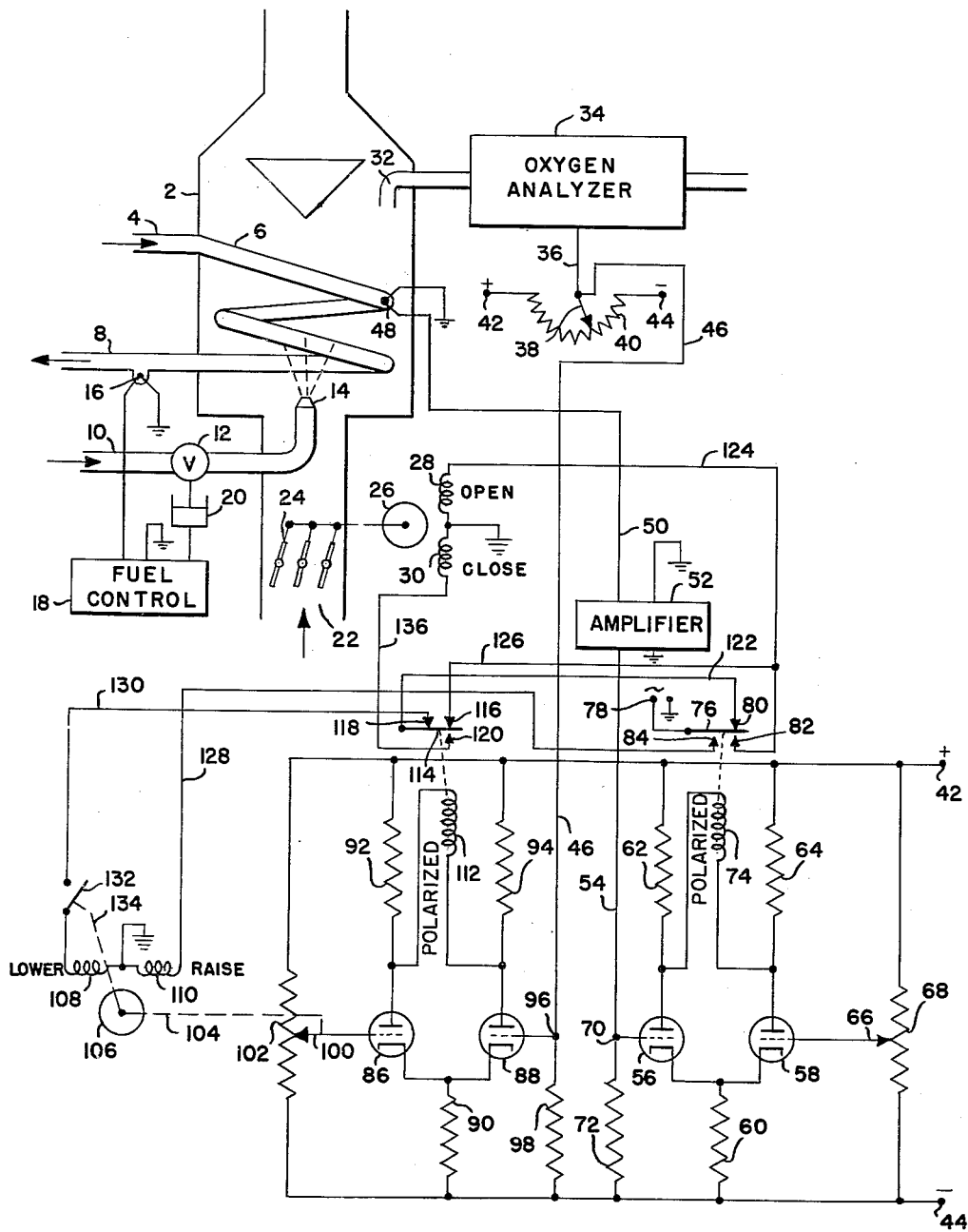

2,980,334
DAMPER CONTROL SYSTEM FOR PROCESS HEATERS
Donald J. Geniesse, Newtown Square, Pa., assignor to Sun Oil Company, Philadelphia, Pa., a corporation of New Jersey
Filed July 25, 1957, Ser. No. 674,218
5 Claims. (Cl. 236—14)

This invention relates to a heater control system designed particularly for a process heater to enable the heater to operate at high thermal efficiency while preventing damage to the heater due to excessive temperatures.

The present trend in process heater design is toward complete radiant extraction under conditions in which the flames are in close proximity to the tubes and setting. Most process heaters are controlled to maintain a constant product outlet temperature. If the temperature at the outlet drops, more fuel is introduced, and vice versa. This is the most important consideration in the control of the heater and it is not desirable to modify this.

Neglecting the effects of poor mixing at very low firing rates, the thermal efficiency is a function of the percentage of excess air. Each heater may conceivably be assigned a fixed percentage of excess air and may be expected to have a reasonably high efficiency over a wide range of firing rates. A less percentage of air may cause incomplete combustion, while a greater percentage of air would increase the heat loss through the stack. For very high fuel rates, however, this small percentage of excess air results in a larger and hotter flame, and although the efficiency becomes high, there is danger of overheating the tubes or the setting. Furnaces of this type are, accordingly, generally operated at a large percentage of excess air at all firing rates to protect the tubes and setting from overheating at high firing rates. While this type of operation is much less efficient, it has been accepted because it demands less attention where there are large fluctuations in the process flow rate or temperature.

The general object of the present invention is to overcome the outlined disadvantages of continuously providing too great an excess of air. In accordance with the invention a continuous oxygen analyzer is used to transmit an output signal which is at least approximately proportional to the amount of excess air in the heater. Temperature sensitive devices are located in the radiant portion of the heater at points where overheating may first be detected. These may be located on the tube walls or on refractory surfaces and may be located in accordance with the general design of the heater. The signals from the oxygen analyzer and the temperature sensitive devices are transmitted to a controller, the output of which controls a damper to regulate the amount of air introduced at the burners, whether there be forced or natural draft.

In brief, the operation is then as follows:

The controller is preset to operate the heater with the minimum percentage of excess air conducive to proper combustion and maximum efficiency at average firing rates. For normal operation, the controller will maintain this percentage of excess air by damper modulation. If a somewhat higher firing rate is called for by a drop in product outlet temperature, the flame may increase in temperature and size to the extent that one or more of the temperatures detected will exceed a preset maximum. This will cause the damper to open and at the same time increase the set point of the excess air control until the temperatures fall below the preset maxima. The controller will then cause the heater to operate at or near the new excess air level. If the high firing rate is not maintained the damper will close and return ultimately to the condition of the preset minimum percentage of excess air. As these changes take place, process heat requirements are satisfied by the separate fuel control system or systems.

The attainment of the foregoing general object and of other objects relating to details of construction and operation will become apparent from the following description, read in conjunction with the accompanying drawing, in which the figure is a mechanical and wiring diagram illustrating a preferred practical embodiment of the invention.

A heater to which the control system is applied is conventionalized at 2, the material to be heated entering at 4 a tube system indicated at 6 and leaving the heater at 8. Fuel is introduced at 10 through a control valve 12 to a burner at 14. A temperature pickup such as a thermocouple at 16 provides a control signal to a conventional fuel control 18 which operates the valve 12 through a motor device 20. Air for combustion, at forced or natural draft, enters at 22 and is controlled by a damper 24 which in the present instance is under the control of a reversible motor 26 provided with windings 28 and 30 arranged to be respectively energized to open and close the damper. What has just been described may be entirely conventional, but may be considerably more elaborate than is shown, involving, possibly, a plurality of burners having separate fuel controls, multiple air inlets, or the like. The heater itself may take many forms commonly used in the art.

In accordance with the present invention combustion gases are sampled at 32 by an oxygen analyzer 34. This analyzer may be of any conventional type providing an output in accordance with the oxygen content of the stack gases, being for example, of the type involving the burning of hydrogen, of the type involving utilization of the magnetic susceptibility of oxygen, or other type. For the purpose of the present invention the output (indicator) shaft 36 of the analyzer drives the variable contact element 38 of a potentiometer 40 connected between positive and negative terminals 42 and 44 to provide a direct potential signal through connection 46.

A temperature pickup element, such as a thermocouple is provided at 48 where the attainment of excess dangerous temperatures may be expected to appear first in the event that the flame becomes too large or too hot. For simplicity of description detailed reference will be made only to the pickup 48 and its connection 50, but it will be understood that another pickup may be connected to the control circuit in any suitable fashion so that it detects the first undue temperature rise and initiates a controlling action. Considering what is specifically shown, the signal emitted at 50 is amplified at 52 to give rise to a direct output at 54.

A pair of triodes 56 and 58 are connected through a common cathode resistor 60 to the negative supply terminal 44 and have their anodes connected respectively through resistors 62 and 64 to the positive supply terminal 42. The terminals 42 and 44 may be the supply terminals, previously referred to, to which the potentiometer 40 is connected. The grid of triode 58 is connected to an adjustable contact 66 of a potentiometer 68 connected between terminals 42 and 44. The grid of triode 56 is connected at 70 to the output line 54 from the amplifier 52 and through resistor 72 to the negative supply terminal 44. The winding of a relay 74 is connected between the anodes of the triodes 56 and 58. This relay is of polarized type arranged to attract its armature 76 when the potential of the grid of triode 56 is more positive than the grid of triode 58; the connections are such that this action occurs when the temperature of pickup 48 rises to provide at 70 a positive potential exceeding the positive potential at adjustable contact 66, the adjustment of the latter, in effect, predetermining the maximum permissible temperature at the pickup 48. In the event that multiple pickups are used, the arrangement described may be duplicated so that the critical temperatures of the individual pickups may be separately predetermined by adjustments of other contacts such as 66.

Continuing with what is specifically disclosed, the armature 76 is normally released so that through its connection at 78 to a source of alternating current it will normally provide energization through its back contact 80. When the relay is energized, connection from supply terminal 78 is effected to contacts 82 and 84.

A second pair of triodes 86 and 88 have their cathodes connected through the common resistor 90 to negative supply terminal 44 and their anodes are connected through resistors 92 and 94 to the positive supply terminal 42. The grid of triode 88 is connected at 96 to the line 46 from potentiometer contact 38 and through resistor 98 to the negative supply terminal 44. The grid of triode 86 is connected to the adjustable contact 100 of a potentiometer 102 connected between terminals 42 and 44. The adjustable contact 100 is arranged to be driven through a mechanical connection 104 by a reversible motor 106 which is provided with a pair of windings 108 and 110 which, when respectively energized, lower and raise the contact 100 along the potentiometer 102, considering the lowering and raising as referring to what is shown in the drawing. The winding of a polarized relay 112 is connected between the anodes of triodes 86 and 88, and the relay attracts its armature 114 when a positive signal at the grid of triode 88 exceeds that at the grid of triode 86. The positive signal at the grid of triode 88 increases as the oxygen content of the sampled stack gases increases. When the relay 112 is deenergized (i.e. does not attract its armature) the armature engages contacts 116 and 118. When it is energized with the proper polarity of signal for it to attract its armature 114 (i.e., when the positive signal at the grid of triode 88 exceeds that at the grid of triode 86, as previously stated), said armature engages contact 120.

Connection 122 extends between contact 80 and armature 114. Contact 82 is connected to motor winding 28 by line 124 and to contact 116 by line 126. Contact 84 is connected to motor winding 110 through line 128. Contact 118 is connected to motor winding 108 through a limit switch 132 which is connected at 134 to the motor 106 to be opened when the potentiometer contact 100 reaches a set lower limit position which corresponds to a normal minimum amount of excess air for average fuel consumption of the heater. Contact 120 is connected to motor winding 30 through connection 136.

Considering, first, what may be regarded as normal operation, that is, under conditions in which the temperature of the pickup 48 does not exceed a predetermined maximum value, the operation is such as to maintain a predetermined oxygen excess by modulation of the incoming air by the damper arrangement 24. Under these conditions the relay 74 is deenergized in the sense that the armature 76 is released to engage contact 80.

Assuming that the contact 100 is in its preset lowermost position involving open condition of switch 132, a minimum oxygen excess is thus predetermined and the motor 106 and contact 100 remain stationary. If the oxygen content of the analyzed gases is lower than this minimum the potential at 96 is less than that at 100, the relay 112 does not attract armature 114, and through the contact at 116 the winding 28 of motor 26 is connected to the power source terminal 78 so that the motor operates to open the damper means 24 to provide an increased flow of air. On the other hand, if the oxygen content of the analyzed gases exceeds the predetermined amount, the potential at 96 exceeds that at 100, and the relay 112 is energized to attract armature 114 to provide contact at 120 through which winding 30 is connected to the power source. Under this condition motor 26 is operated to move the damper means 24 toward closed position, thereby reducing the air inflow. The result, then, is that the damper hunts to maintain the oxygen excess substantially constant by modulation of the air flow. Movements of the damper means as just described will generally be caused by changes in fuel flow under control of the temperature pickup at 16 or other fuel control. Ordinarily, then, during normal operation, as defined above, the minimum oxygen excess for most efficient operation is maintained.

If the firing rate increases to an abnormal extent, there will be reached a condition in which one of the temperature pickups such as 48 will produce at terminal 70 a higher potential than that preset at potentiometer contact 66, which setting determines the maximum temperature permissible at 48. When this occurs the relay 74 attracts armature 76 making contacts at 82 and 84. The contact at 82 effects immediate energization of the winding 28 to cause motor 26 to open the damper means 24. Thus the control operates immediately to alleviate the condition giving rise to the abnormal temperature increase, this operation overriding the matter of oxygen content, providing an amount of air in excess of that which would be normal.

At the same time the contact provided at 84 produces energization of winding 110 of motor 106 to initiate rise of contact 100 of potentiometer 102. The initial operation of motor 106 in this fashion closes switch 132. But as soon as switch 132 is closed, if the potential at 96 is less than that at 100 so that winding 112 is deenergized, the winding 108 of motor 106 is also energized from the terminal 78 through 76, 82, 126, 116, 114, 118, 130 and 132. Energization of both windings 110 and 108 in this fashion halts the motor 106.

However, when the oxygen content increases to raise the potential of 96 above that of 100, relay 112 is energized and the contacts at 116 and 118 are broken. The result is that motor winding 108 is deenergized while winding 110 remains energized, so that the motor 106 operates to raise contact 100 until the potential at 100 equals that at 96 whereupon both motor windings are again energized to arrest the motor. If the motor action raises the potential at 100 at a rate greater than the rate of rise of potential at 96, winding 112 is deenergized, resulting in the energization of winding 108 of motor 106 (winding 110 thereof already being energized, as previously discussed) and the consequent stopping of motor 106. The potential at 100 thus follows that at 96 so as to be aproximately equal to it regardless of when relay 74 is deenergized.

The foregoing continues until the potential at terminal 70 drops below the potential set at terminal 66. When the control of temperature is effected so this occurs, relay 74 releases armature 76 providing contact at 80. Modulating control is then effectively about the new set point established by the new position of contact 100. If the oxygen content of the gas rises above that corresponding to the new set point, i.e., if the potential at 96 is above that at 100, relay 112 attracts armature 114 making contact at 120 to effect operation of motor 26 in a direction closing the damper means. At the same time the opening of contact at 118 deenergizes the line 130 and interrupts any operation of motor 106. As the damper closes it will reduce the oxygen content in the stack gases and the potential at 96 will drop below that at 100 whereupon armature 114 is released to effect contact at 116 to open the damper means and contact at 118 to effect lowering of contact 100. Whenever the last contact reaches a position such that its potential is less than that at terminal 96 the armature 114 is moved to its lower position interrupting the action of motor 106 and effecting closing of the damper means. The action is thus intermittent and relatively slow, at any moment the control being effectively about the set point of contact 100 with an intermittent dropping of this contact so long as the potential at 70 by reason of a permissible temperature at 48 does not exceed the potential at contact 66. The apparatus accordingly automatically maintains adjustment for the minimum average air flow to keep the temperature at 48 below the critical temperature. As conditions ultimately reach normal the contact 100 will be brought to its lower limited position corresponding to opening of switch 132, the normal operation described above then occurring with modulation of the air flow by the damper means.

In accordance with the foregoing, therefore, there is provided under abnormal conditions a fast opening of the damper means, uninterrupted by the matter of oxygen content of the stack gases so that alleviation of the high temperature is quickly afforded as is required for safety. On the other hand, the restoration to normal condition is relatively slow by reason of the intermittent operation of motor 106 so that due account is taken of the fact that the conditions producing abnormal temperature may only be gradually changed. The overall result is that for major periods the excess oxygen is retained at the desired minimum to provide maximum efficiency of operation, substantial excess oxygen being provided only during an abnormal period and during restoration to normal conditions. It will be noted that there is no interference with the fuel control effected at 18, this control responding solely to the temperature of the processed fluid.

While as specifically described the operation is electrical, it will be evident that the elements described may be replaced by mechanical, pneumatic, or hydraulic means. It will also be understood that conventional means such as are commonly used in controls may be provided to minimize hunting, as of the motor 26, and to provide the delays, rate responses, or the like, where desired. All of such variations may be adopted without departing from the invention as defined in the following claims.

What is claimed is:

1. Apparatus for control of a fuel-burning heater comprising means for controlling the supply of combustion air to a heater, an oxygen analyzer responsive to oxygen content of products of combustion in said heater, means establishing a set point for oxygen content of said products of combustion, means responsive to said oxygen analyzer and to said set point establishing means for operating said air supply controlling means to maintain the oxygen content of the products of combustion normally approximately at said set point, means responsive to a temperature in said heater, means controlled by said temperature responsive means to operate said air supply controlling means to increase air flow irrespective of the first mentioned operating means when said temperature exceeds a predetermined value, and means controlled by said temperature responsive means to operate said set point establishing means to raise the set point when said temperature exceeds a predetermined value.

2. Apparatus for control of a fuel-burning heater comprising means for controlling the supply of combustion air to a heater, an oxygen analyzer responsive to oxygen content of products of combustion in said heater, means establishing a set point for oxygen content of said products of combustion, means responsive to said oxygen analyzer and to said set point establishing means for operating said air supply controlling means to maintain the oxygen content of the products of combustion normally approximately at said set point, means responsive to a temperature in said heater, means controlled by said temperature responsive means to operate said air supply controlling means to increase air flow irrespective of the first mentioned operating means when said temperature exceeds a predetermined value, and means controlled by said temperature responsive means to operate said set point establishing means to raise the set point when said temperature exceeds a predetermined value, and to lower the set point following such raising when said temperature drops below said predetermined value.

3. Apparatus for control of a fuel-burning heater comprising means for controlling the supply of combustion air to a heater, an oxygen analyzer responsive to oxygen content of products of combustion in said heater, means establishing a set point for oxygen content of said products of combustion, means responsive to said oxygen analyzer and to said set point establishing means for operating said air supply controlling means to maintain the oxygen content of the products of combustion normally approximately at said set point, means responsive to a temperature in said heater, means controlled by said temperature responsive means to operate said air supply controlling means to increase air flow irrespective temperature exceeds a predetermined value, means controlled by said temperature responsive means to operate said set point establishing means to raise the set point when said temperature exceeds a predetermined value, and to lower the set point following such raising when said temperature drops below said predetermined value, and means limiting the last mentioned lowering of the set point.

4. Apparatus for control of a fuel-burning heater comprising means for controlling the supply of combustion air to a heater, an oxygen analyzer responsive to oxygen content of products of combustion in said heater, means establishing a set point for oxygen content of said products of combustion, means responsive to said oxygen analyzer and to said set point establishing means for operating said air supply controlling means to maintain the oxygen content of the products of combustion normally approximately at said set point, means responsive to a temperature in said heater, means controlled by said temperature responsive means to operate said air supply controlling means to increase air flow irrespective of the first mentioned operating means when said temperature exceeds a predetermined value, and means controlled by said temperature responsive means to operate said set point establishing means to raise the set point when said temperature exceeds a predetermined value, and to lower the set point in stepwise fashion following such raising when said temperature drops below said predetermined value.

5. Apparatus for control of a fuel-burning heater comprising means for controlling the supply of combustion air to a heater, an oxygen analyzer responsive to oxygen content of products of combustion in said heater, means establishing a set point for oxygen content of said products of combustion, means responsive to said oxygen analyzer and to said set point establishing means for operating said air supply controlling means to maintain the oxygen content of the products of combustion normally approximately at said set point, means responsive to a temperature in said heater, means controlled by said temperature responsive means to operate said air supply controlling means to increase air flow irrespective of the first mentioned operating means when said temperature exceeds a predetermined value, means controlled by said temperature responsive means to operate said set point establishing means to raise the set point when said temperature exceeds a predetermined value, and to lower the set point in stepwise fashion following such raising when said temperature drops below said predetermined value, and means limiting the last mentioned lowering of the set point.

References Cited in the file of this patent

UNITED STATES PATENTS

| 1,895,701 | Brown | Jan. 31, 1933 |
| 1,940,355 | Knapp | Dec. 19, 1933 |
| 1,956,577 | Irwin | May 1, 1934 |
| 2,052,375 | Wunsch et al. | Aug. 25, 1936 |
| 2,370,897 | Whitcomb | Mar. 6, 1945 |
| 2,586,503 | Barnard | Feb. 19, 1952 |